(12) United States Patent
Solomon

(10) Patent No.: US 8,395,668 B2
(45) Date of Patent: *Mar. 12, 2013

(54) SYSTEM AND METHODS FOR NETWORK COMPUTING INTERACTION WITH CAMERA

(76) Inventor: Neal Solomon, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/932,865

(22) Filed: Mar. 8, 2011

(65) Prior Publication Data
US 2012/0229655 A1 Sep. 13, 2012

(51) Int. Cl.
*H04N 5/225* (2006.01)
*H04N 5/217* (2011.01)

(52) U.S. Cl. .................................. 348/207.1; 348/241

(58) Field of Classification Search ............... 348/222.1, 348/241, 252, 234, 235, 231.99, 207.1, 207.11; 345/2.3, 102.7; 382/167, 274, 293, 162, 382/163
See application file for complete search history.

(56) References Cited

U.S. PATENT DOCUMENTS

2007/0236574 A1* 10/2007 Alon et al. ............... 348/207.99
2008/0174678 A1* 7/2008 Solomon .................. 348/231.99

* cited by examiner

*Primary Examiner* — Roberto Velez
*Assistant Examiner* — Stephen Coleman

(57) ABSTRACT

A multi-functional digital imaging system is described that disaggregates camera functions into network computing interactions with at least one image capture device. The camera captures the image and sends the image file to at least one external computer for filtration and modification of the image file.

19 Claims, 15 Drawing Sheets

SYSTEM AND METHODS FOR NETWORK COMPUTING INTERACTION WITH CAMERA

CROSS-REFERENCES TO RELATED APPLICATIONS

The present application claims the benefit of priority under 35 U.S.C. §119 from U.S. Provisional Patent Application Ser. No. 61/338,771, filed Mar. 9, 2010, the disclosure of which is hereby incorporated by reference in their entirety for all purposes.

FIELD OF THE INVENTION

The invention pertains to optical image capture, digital image sensors, digital image signal processing, digital image filtration and network computing functions involving digital imaging and digital video files and database management involving digital imaging and digital video files.

BACKGROUND OF THE INVENTION

A digital camera consists of an optical component, a digital sensor component, image processing circuitry, camera system circuitry, and a file storage component. Each of these component types have undergone, and continue to undergo, evolution. A problem that emerges is the issue of obsolescence. As each component in a camera system is updated, the overall system becomes obsolete, much like a computer. This constant updating and obsolescence forces users to upgrade to newer camera technology every few years.

The history of digital imaging is a story of filtration solutions to optical and digital aberrations. To solve these image aberrations, engineers have used integrated circuits and software techniques to address specific problems. For example, aliasing and moiré effects have been solved by applying anti-aliasing and low-pass filters that contain complex software algorithms. Further, the problem of optical aberrations, such as vignetting, pin cushioning and chromatic aberrations, are filtered by applying digital solutions. The need to improve these solutions forces the camera circuitry to be upgraded periodically, which creates the problem of obsolescence.

As camera elements have gotten smaller and more efficient, cameras have become ubiquitous. It is common to find camera components embedded in wireless phones and devices (PDAs), tablets and mobile computers. Not only are these optical systems able to process still digital images, but they are also able to capture, process, filter and manage digital video images. The problem remains, however, whether in digital cameras, digital video cameras or wireless devices with camera components, that the quality of the image produced is often poor. The smaller and cheaper the digital camera, digital video camera or digital optical device, the more problematic the image quality becomes.

So far, the idea of the digital camera has been limited to a device which contains integrated optical components, a sensor component, digital image signal processing circuitry, digital image filtration circuitry and digital file storage circuitry. However, each of these integrated components may be improved upon in a modular way and disintegrated in successor upgraded imaging devices.

It is possible to use digital imaging technologies to improve digital image problems such as optical and digital aberrations. Solomon (U.S. Pat. No. 7,612,805) has developed a digital imaging system for filtration to improve optical and digital aberrations created by lens and sensor constraints. Specific digital imaging filtration techniques are available as algorithms applied to specific imaging problems.

In addition to providing filtration, digital imaging provides the opportunity to manipulate the image to user preferences. For example, it is possible to manipulate depth of field in digital images by controlling lens aperture.

The digitalization of images further allows digital files to be transmitted on computer networks for storage. Shutterfly has developed a business model based on the storage and management of digital images on computer network servers and databases for photo sharing.

The dominant model for advanced digital photography is the digital single lens reflex (D-SLR) camera. In the main, most D-SLR cameras are organized to work within one paradigm. Film-based SLR cameras operate by using a lens apparatus connected to a camera body. When a shutter button is depressed, a microprocessor in the camera activates a shutter in the camera and an aperture in the lens to capture light onto a plane of film after a mirror flips up exposing the film. The silver-halide-based film is then chemically developed and images are preserved.

In a D-SLR, when the shutter button is depressed, a microprocessor (or SoC) in the camera activates a shutter in the camera and an aperture in the lens to capture light onto a digital sensor after a mirror flips up exposing the digital sensor. The sensor is typically either a charge coupled device (CCD) or a complementary metal-oxide semiconductor (CMOS) circuit that converts light to electrons. Once the sensor is exposed to light from the lens, camera circuitry moves the data from the sensor to a digital signal processor (DSP). The DSP performs a set of functions that filter the digital image file and transfers the converted data file to camera circuitry that stores and displays the corrected image file. A microprocessor (or SoC), which accesses a database in the camera, controls the image exposure settings, the internal camera circuitry and the mechanical operations of the shutter. In some cases, the camera microprocessor circuitry provides feedback to a microprocessor in the lens in order to measure and control the lens aperture and to synchronize exposure information between the lens aperture and the camera shutter. The user is able to manipulate the lens aperture, the camera shutter speed, the camera ISO speed, the data compression rate, and, in some cases, artificial light (such as a flash). The camera circuitry converts an analog image to digital format and converts the digital file to an analog image for presentation.

When any of these digital camera components can be improved, it is unfortunately necessary to upgrade the entire camera system. This process of upgrading a camera is costly and inefficient for the user. What is needed is a modular system that is able to upgrade different camera components independently.

SUMMARY OF THE INVENTION

As broadband telecommunications and computer networks become ubiquitous, the opportunities for integrating photographic work flow processes are tremendous. The present system presents a set of methods to improve digital image work flow by using external disaggregated camera devices with multiple remote network computers.

Image storage, image file interaction, image sharing, software evolution and management, remote image filtration, image management and remote printing processes are described in the present invention.

The present invention views a camera system as an aggregation of components and functions that may be disaggregated. By disaggregating camera functions, such as sensor, camera circuitry, filtration mechanisms and data storage, it is possible to build a modular and improved camera system. Such a camera system is able to be personalized for specific image functions. Viewed in this light, the modular idea of a camera that is a set of disaggregated components sees a camera as an imaging process.

The present modular multi-functional camera system allows the separation of an optical mechanism from the main components of digital imaging circuitry. The digital capture mechanism can essentially be separate from the digital image filtration components. The digital imaging and filtration circuitry may be separated from the digital storage components. The idea of a camera is thus disintegrated into differentiated components that may be in different locations.

The present system therefore develops a modular camera system for image capture, filtration, optimization, display and management of digital still or video files. Each of these camera components may be performed on different platforms. For instance, the digital image capture occurs at one location while the digital filtration occurs at a second location, modeling, analysis and optimization of the digital image at a third location, the digital image management occurs at a fourth location and the image is finally displayed at a fifth location. At any stage in the process, the user may maintain control of the imaging process. In fact, since there is more computer processing and data storage capacity in computer networks than in a camera, the image work flow process is accelerated While the image quality improves appreciably.

Digital imaging has become ubiquitous in recent years. Consequently, the present invention applies to a range of imaging technologies. The imaging devices and systems to which the present invention applies include all digital cameras and digital video cameras. These camera devices include cell phones, PDAs, telephones, video camcorders, digital video cameras, digital SLRs, laptops, netbooks, tablet computers and video teleconferencing systems. The system also applies to medical diagnostics, sensor networks, satellite imaging systems, printers and copiers.

The present system solves a range of imaging multi-objective optimization problems (MOOPs). For example, the system modulates shutter speed, aperture and ISO (and flash) to optimize DOF. Also, the system modulates exposure, zoom and video. DSPs and image processing circuitry are optimized to solve each type of MOOP.

The present invention provides a set of advances to the field of digital imaging.

Novelties Of The Invention:

The present system develops a disaggregated digital imaging system which consists of a set of modular components. Viewed in this light, cameras will consist of less internal image processing components, which will control their costs and persistent obsolescence. Instead, the digital image processing components are external to the camera, downloaded to the camera or contained in external devices such as laptop or network computers. For example, the digital image filtration, analysis, modeling and optimization functions are better performed off-site.

Furthermore, using external computer network data storage dramatically transforms user work flow.

External computer networks become integrated into the extended modular camera system by utilizing broadband bandwidth. As broadband bandwidth becomes a commodity, access to computer networks becomes a utility. The present invention conceives of digital image processing as a service in which images are analyzed, filtered, optimized and stored in computer networks, but controlled by user customization.

Advantages Of The Invention:

The present system allows the camera to be disaggregated into specific upgradable components that allow the management of image work flow in order to optimize image quality for each user. There are layers of features available to users on demand that turns imaging into a process. Image processing speed is improved along with the dramatic increase in the size and quality of image files.

The combination of these elements suggests that each camera is personalized for each user at the most efficient cost. As each photographer uses more features, the camera as service process increases the fees correspondingly. Each user may optimize the digital imaging process by using extensive computer network functionality of image file analysis, modeling, filtration, optimization, storage and display.

Overall, camera prices decline markedly while image quality dramatically increases in the present system. Smaller imaging components in inexpensive devices (PDAs, smart phones, tablets, laptop computers and so on) become feature rich elements that optimize digital imaging and digital video.

LIST OF ABBREVIATIONS

ASIC, application specific integrated circuit
CCD, charge coupled device
CMOS, complementary metal oxide semiconductor
CPU, central processing unit
CRT, cathode ray tube
DCT, discrete cosign transform
DOF, depth of field
D-SLR, digital single lens reflex (camera)
DSP, digital signal processor
DVI, digital video imaging
EPCA, exposure priority camera activation
FPGA, field programmable gate array
FFT, fast Fourier transform
LCD, liquid crystal display
LED, light emitting diode
MOOP, multi-objective optimization problem
OLED, organic light emitting diode
OPCA, object priority camera activation
PDA, personal digital assistant
RGB, red green blue
SDI, still digital image
SoC, system on chip

DESCRIPTION OF THE PREFERRED EMBODIMENTS (1) Distributed Computing Digital Image Storage Process As digital image sensors increase in data processing capabilities, the file sizes they create increase correspondingly. This growth in file size has created a set of file storage and management problems. In effect, since the camera storage system is limited, it is easy to get clogged with large image data files.

The present invention conceives of a camera as a clean desk for image capture and image file organization. The camera captures images with the image sensor and forwards large files to a remote computer. The camera copies, compresses and stores the large original files as smaller files in the camera storage system. The original image files are off-loaded to network computers for storage, management, filtration and optimization. The image files are backed up with at least one copy for each original image file. This process of uploading images to a computer network occurs wirelessly and automatically.

The external network computers aggregate database management systems to reorganize the image files. The image files are organized in libraries of similar image types. The images are typed and ordered according to the image category, the time of origin, the date of most recent access and the user priority. The images in the external computer database are retrieved according to the categories of database organization.

In an embodiment of the invention, the original image files are offloaded to a stand-alone memory device rather than to a computer.

(2) Digital Image Process Workflow with Remote Computer

Given the view of a disaggregated camera as a clear desktop, images are processed by the camera in two main ways. First, the camera captures images using its lens(es) and digital image sensor. Second, the camera filters and manages images that are either stored in the camera or stored out of the camera.

The image capture with a lens and digital image sensor of native image files are stored either in the camera or in an external computer network.

The user may select to filter the image in a process directly from the image sensor. However, native image files may be immediately stored in memory in a first step of the work flow process and then filtered and managed by the camera (or by an external computer) at a later time.

In order to filter the images during a sequence at the time of the original capture, a DSP is used in the camera production circuitry. In order to filter the images after original capture, either the production DSP is employed or a separate DSP in display circuitry is employed. The benefits of two DSPs in different camera circuits are the multi-tasking capabilities of the camera. Further, the camera downloads software tools from external computers on-demand to be used by the DSP(s) to filter specific images.

In one embodiment, the camera downloads software that is used to program the DSP(s) to perform specific filtration of specific optical and digital aberrations. These filters are tuned to correct aberrations of specific camera optics and electronics.

In an additional embodiment, the microprocessor or SoC of the camera itself identifies specific camera aberrations, develops solutions and forwards the solutions to the camera main DSP or ancillary DSP to apply to specific images.

In another embodiment, an external computer analyses the digital images from a specific camera, identifies aberrations, designs software algorithms to correct the aberrations and transfers the program code to the camera, which implements the code in the main or ancillary DSP and modifies or filters the existing or successive images.

(3) Digital Image File Interaction Process Between Camera and Network Computers

Not only does the network computer system store image files, they actively filter the images. The filtered images are transferred to the original camera or to remote displays for viewing. The user simply requests specific filtration adjustments to the image and the external computer performs the operation and returns the edited image to the camera.

The user specifies the image filtration optimization parameters and computer program code applies the specific filtration algorithms to correct optical and digital aberrations in specific images. In some cases, the filtration software is tuned to specific lens models and to specific camera models.

In addition to filtration, the remote computer system performs select photo editing that is programmed by the user.

In an embodiment of the system, the user accesses a library of image manipulation software and edits the image on a remote computer.

In the optimal image processing workflow model, the camera photographs a scene and automatically forwards the image file to a remote network computer system. The remote computer system analyzes the images as they are input and forwards the images to specific specialized computers for automated processing. In one implementation, the photographer has manual control of select filtration technique applications to specific images. The images are filtered, edited and optimized, with copies of each version of the filtration process stored in remote databases. The filtration process corrects optical and digital aberrations. Moreover, the user may select special effects filtration to apply to specific images. The optimized images are then returned to the original camera, to a remote camera, to a remote computer or to a remote image display for viewing. The photographer accesses a report for each image that lists the specific filtration techniques applied to the image. This information is useful to allow the photographer to understand the camera's limitations.

The use of external computing capabilities greatly expands the filtration capacities beyond a single camera alone. One advantage of this process is that the filtered images are reviewed by the photographer in real time so that the user can modify their image capture approach. This process of workflow analysis accelerates the learning aspects for a photographer while also automating image optimization.

(4) Method for Sharing Digital Image Database Files Between Camera Computer System and Network Computer System While the image file storage in the camera is limited, the storage capabilities of a computer network are far more substantial. For this reason, the camera computer system is constrained in relation to the computer network. Image files in the camera are managed by the camera database management system. The camera files are organized by date, image number, image type, filtration version and user preferred rank. The camera files are off-loaded to an external database for storage and for additional filtration.

The network computer system has a library of image software programs in a database management system. The image software programs are organized by program type.

A user may select to automatically apply specific software programs to specific image files.

(5) Method for Evolving Digital Image Algorithm in Network Computing Database Management System Software programs never sit still. As image software programs evolve, the most recent version is stored in a library for access to users. As image files are input into the computer network, the software is accessed on-demand by the user to perform a specific optimization function. Not only are the software programs applied to image files in the computer network, but the most recent software algorithms are automatically downloaded to the user's camera. For example, the computer network continuously updates the camera's filtration algorithms as the user requests. The computer network may forward the software from any specific computer in its system. Specific specialized software may be sent from specialized libraries in different locations in the computer network.

(6) Method for Organizing Custom Digital Image Effects Interaction Between Network Database Management System and Camera Device While it is useful to have pre-set software to correct existing image aberrations, the present system custom designs software for digital image effects, evolves and stores the custom effects software in a network computer system and downloads the software to camera devices on-demand. The computer network maintains a library of special effects that are applicable to different image types. The user may combine two or more special effects to create a custom effect, which is then applied to an image file either in the network computer or in the user's camera. Furthermore, the user may design a unique special effects program to apply to a specific image or set of images.

Generic effects software and filtration software to correct optical or digital aberrations are accessible on the computer network database. Custom designed effects software, including software programs available from third parties, are available from a network computer database as well.

It is useful to automatically use remote computer generic effects or filtration software to apply to image files either in a remote computer or in a user's camera. In addition, it is useful to have a custom configured effects software applied to image files in a remote computer or in a user's camera on-demand. These software programs and algorithms are also available as a service.

(7) System for Organizing Network Computer DSP for Multi-functional Digital Image Filtration While the in-camera main DSP in the image capture circuitry and the ancillary DSP in the display circuitry are capacity-constrained, the DSPs in the network computing system have broad capabilities. In effect, the DSPs in the computer network provide massive processing power to filter digital images from numerous sources by using numerous algorithms. Multiple specialized DSPs are used in the remote computing network system.

The advantages of external DSPs to the photographic work flow process include both high speed and broad resource capacity.

Not only do the network computer DSPs filter, optimize, edit, manage and store unfiltered image files forwarded from a digital camera, they take previously filtered imaged, remove the filtration and re-filter the images with advanced combinations of filtration and optimization algorithms. The network computer DSPs receive a digital image file from a camera, which includes a tag with meta-data. The image file meta-data contains information on the camera model, sensor type, the lens type, the aperture, shutter speed and ISO data, the filtration algorithms used and other pertinent information. The network computer DSPs then assess the optical and digital aberrations of the image file and compare the user requested parameters for specific effects. The network computer DSPs remove layers of camera DSP filtering in a series of phases to return the image to the original. The network computer DSPs and microprocessors (and SoCs) compare an original image to standardized and optimized database images to assess the aberrations. The network computer DSPs and microprocessors (and SoCs) create a list of suggested filtration techniques to apply to the image by using the database comparison and the user preferences. The network computer DSPs then activates a sequence of algorithms to filter the image. The filtered image is forwarded to storage in the network computer database and to the user's computer or camera for review. The user may update the filtration program parameters or keep the filtered image in its present form. In order to reverse the filtration, the layers are specified in a table in a database which is accessed by the SoC, and the process is reversed.

(8) Method for Organizing Digital Image Correction Algorithm Interaction Between Network Computer and Camera Camera DSPs perform the filtration process with pre-programmed software. This is a static procedure with deterministic software. The need to upgrade software is important in order to limit obsolescence.

The present system constantly evolves software algorithms in network computers. The upgraded versions of the software algorithms are available to download to user cameras to upgrade the DSP software (and camera firmware). This is done in one of several ways. First, the upgraded software is automatically downloaded. In this case, the camera wireless device component is set to "open" to receive the downloaded software periodically. Second, the upgraded software is available for manual downloading as a user requires. Third, the upgraded software is available for a fee. The fee may be an annual subscription fee or may be a one-time use fee. The user can access the software automatically after payment of the fee.

Once downloaded, the software notifies the user of the upgrade. The software automatically updates the DSP software by adding or removing algorithms.

In an embodiment of this method, the camera accesses a network computer to update microprocessor or SoC software.

By using this software upgrade path, the camera software is constantly made new.

(9) Method for Organizing Dynamic Modulation of Software and Digital Image Files with Bandwidth Segmentation and for Interaction Between Remote Computer and Camera Broadband wireless data communication is becoming ubiquitous. Nevertheless, uncompressed image files can be relatively large. In order to upload a set of image files wirelessly from a camera to a network computer system, it is necessary to either compress the image file in order to conserve space or to increase the efficiency of the communication bandwidth.

The present system uses a process to split wireless communication bandwidth between functions by using specific bandwidth segments. The bandwidth is split into several main segments, with specific digital images allocated by priority.

As a set of digital images is uploaded from a digital camera to a network computer system, the upload begins with a high priority but shifts to a lower priority bandwidth segment as the uploading process progresses so as to optimize bandwidth utility. Specific images are allocated as high priority with others allocated as lower priority. The user may rank the best images and send these as high priority or may identify specific images for filtration by priority preference. Different file priorities are used for different wireless bandwidth segments.

In an embodiment of the present method, the system provides for bandwidth segment switching. That is, the bandwidth segments modulate to accommodate different priorities of image file preferences at different times.

In another embodiment, the image files are disaggregated and uploaded in different bandwidth segments. For instance, a filtered image file may consist of a set of layers that are disaggregated. Similarly, a filtered image file may consist of a set of versions that are separated. The disaggregated image files are transferred on different bandwidth segments.

One advantage of bandwidth segmentation is to prioritize image file transfer. Higher relative priority images are sent in the higher priority bandwidth segments.

Another advantage of bandwidth segmentation is that there are two way communications both from and to the camera. While software programs and image files are downloaded to the camera, image files are uploaded from the camera. The bandwidth segmentation process precludes bottlenecks by constantly re-modulating the priority of file transfer.

In the context of video file transfers, the bandwidth segmentation model is useful because these files tend to be very large even when compressed. Nevertheless, the large video files are disaggregated into specific sections and are thus able to be prioritized for transfer. In the most common case, the video files are transferred in sequential order from the first image to the last. In these cases, video file transfer has a buffer to allow playing the file immediately from the beginning while the remainder of the video file is still streaming. However, by breaking the file into several parts, the bandwidth segmentation model allows the video file transfer rate to be accelerated.

In an embodiment of this system, the camera identifies the closest computer in the computer network system to which to transfer its files. While this proximity priority is coupled with specialty preference of the specific remote computer, the user has an option of sending files to different computers over time. Therefore, the system allows the camera to modulate the distance and specialty of network computers by re-prioritizing their registration in the file transfer system for temporal acceleration of uploads and downloads.

(10) Method for Managing Digital Image File by Remote Editors in Distributed Computer Network One of the advantages of using a network computer system is the ability to access files from anywhere. As applied to digital image and video files, the present system allows multiple individuals to edit an image file from different locations. The image file is stored in a specific location, with backup file storage in other locations. The image file versions are numbered. Individual editors at different locations access the image files and perform specific filtration, editing or optimization functions on the image. These functions are registered in a list attached to the meta-data on the image tag. As one editor makes a change to the image, the version and changes are noted and registered, while the image is returned to storage. As each editor makes a change, the process is repeated. The photographer or editor can access the image at any stage in its evolution. This approach is useful when an editor creates and applies a specific editing algorithm aimed at improving the image. This file sharing capability is unique to image files.

(11) Method for Managing Digital Images in Specialized Distributed Computer Network Specific computers in the network computer system are specialized. Specific computers accumulate specialized programming functions that are tuned to specific types of images or image improvements. As different image file types, filtration functions and software are organized in specific specialized computer databases, specific camera files are directed to the specific remote computers. For example, specific digital camera types of each manufacturer are directed to specialized computer databases. Similarly, digital video cameras will have different files than digital still cameras. In another example, third parties will focus on a specific filtration software type directed to a different image file type for each of its main computers. When files from specific cameras are directed to these specialized computers, the computer network system is made increasingly efficient.

In one embodiment of the system, each of the image files is transferred from a camera to a central computer. The central computer identifies the camera type, the sensor type, the lens type and the image type. The central computer then routes the image to a specific specialized computer for analysis, filtration and storage.

(12) Distributed Computer Digital Image Printing Method

Digital images are optimally viewed in an analog display rather than in a camera device. The present system facilitates the direct transfer of a digital image file from a camera to a printer. Once the user selects the image to print, the file is transferred to the printer device for printing.

In another embodiment of the invention, the image file is transferred from the camera to a computer network system. The computer network filters and optimizes the image and transfers the image file to a printer. The printer can be at the location of the photographer or at a remote location.

With the computer network system integrated into the camera work flow, the image file can be transferred and displayed anywhere.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

DETAILED DESCRIPTION OF THE DRAWINGS

Figure 1:
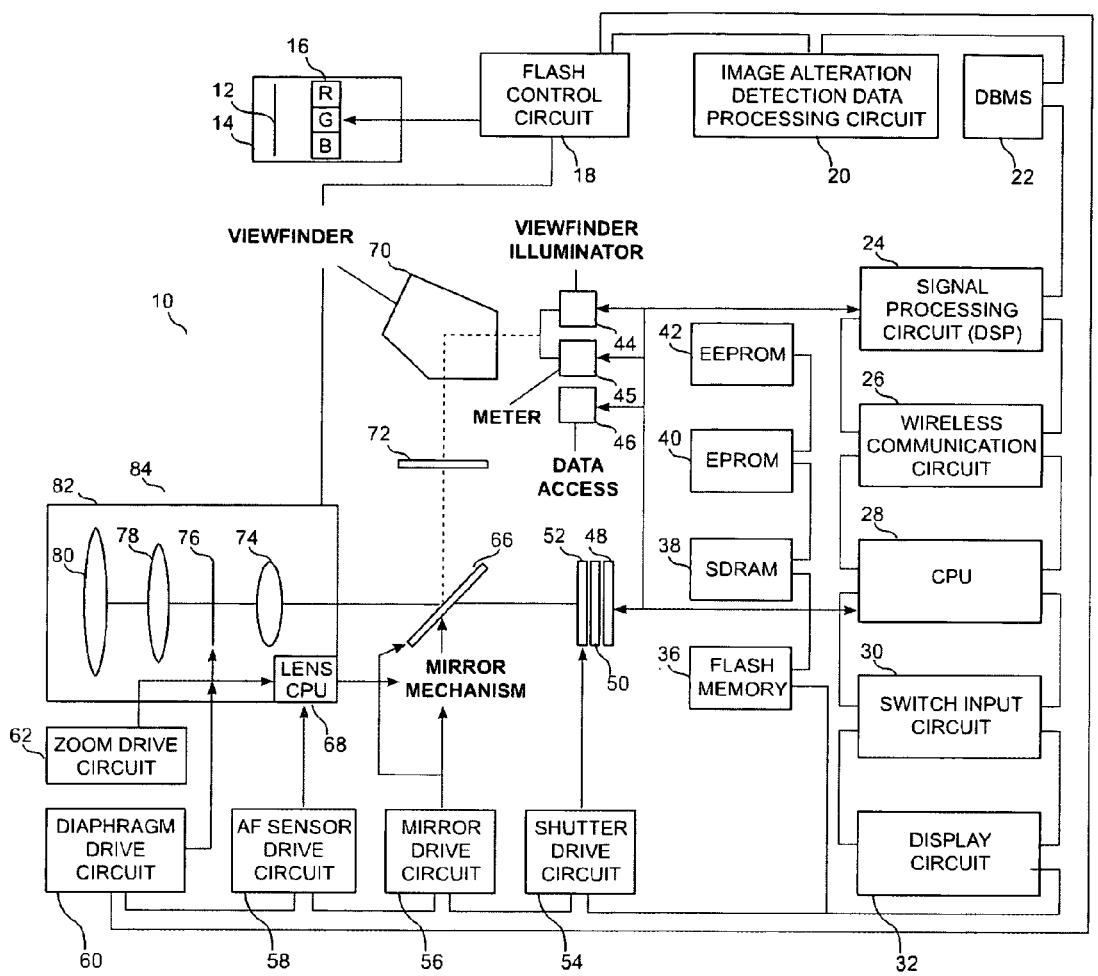
FIG. 1 is a schematic diagram of a digital camera circuit.

FIG. 1 shows the digital camera circuitry. The camera (10) consists of a housing with electronic circuitry to capture, process and store digital image files and a lens (84). The lens consists of a lens barrel (82), a set of lens groupings, including a front lens element (80), a middle lens element (78) and a rear lens element (74). The lens also includes a aperture diaphragm (76) and a lens CPU (68). In some cases, the lens includes at least one motor for autofocus. The lens may be a zoom lens or a fixed focal length lens. If the lens is a zoom lens, which provides a range of optical focal lengths, the lens includes a zoom drive circuit (62). The lens circuitry works in conjunction with the camera circuitry to maintain the aperture with a diaphragm drive circuit (60) and an autofocus sensor drive circuit (58).

In some, but not all cases, the camera contains a flash mechanism to provide artificial illumination. In FIG. 1, the flash mechanism is shown (14) with an illuminator (12) and a light apparatus (16) consisting of red, green and blue light functions. The flash mechanism is connected to a flash control circuit (18). In some cases, the flash mechanism is a separate apparatus that is attached to the camera device and is not internal to the camera.

The camera maintains a mirror in its single lens reflex (SLR) mode. In this case, the mirror mechanism (66) is operated by the mirror drive circuit (56). The mirror is in the down position in order to reflect light to a viewfinder (70) through a diaphragm (72) to allow the image from the lens to be viewed in the viewfinder. Not all embodiments of the invention, however, require a mirror mechanism. The viewfinder is illuminated (44) by a light in order to read information. Electronic data (46) is supplied to the user in the viewfinder, including the metering information provided by the camera metering system (45). The lens has a CPU (68) which may be a microprocessor or an SoC.

The camera uses a shutter apparatus (52), which is driven by a shutter drive circuit (54). When the mirror and the shutter are activated, light passes from the lens to the Bayer filter or anti-aliasing filter (50) and to the digital sensor (48). The digital image file is created by the digital sensor by converting photons to electrons. The image file is sent to either the signal processing circuit (DSP) (24) or the CPU (28). The image file is then sent to storage, typically a flash memory apparatus (36). In some cases, the image file is sent to an ASIC or cache for temporary storage before the DSP or CPU will process the file. In addition, the CPU may contain circuitry including an analog to digital converter, a digital to analog converter and a programmable gain amplification circuit. The CPU may be a microprocessor or a SoC.

In order to process the file, the CPU and DSP store data and instructions in EEPROM (42), EPROM (40), SDRAM (38) and DBMS (22) components, retrieve the data and instructions, process the file and send the processed file to storage. The aggregated camera circuitry may be contained in a single system on a chip (SoC) device, which integrates a set of microcircuits and memory devices with specific functionality.

The camera also uses a switch input circuit (30) to control the camera functions and an image alteration detection data processing circuit (20) to process the image. The image is viewed in a display, typically an LED or LCD on the back of the camera, which is controlled by a display circuit (32). The display circuit may contain its own DSP to process and filter image files. The camera also uses a wireless communication circuit (26) to communicate wirelessly with outside devices. The wireless circuit may be Wi-Fi (802.11 b/g/n), Bluetooth, 3G or 4G LTE. For example, the camera may upload image files to other devices or may download image files, software or algorithms from other devices. In another implementation, the camera may use USB 1.0, 2.0 or 3.0, Firewire or Thunderbolt communications connections.

Figure 2:
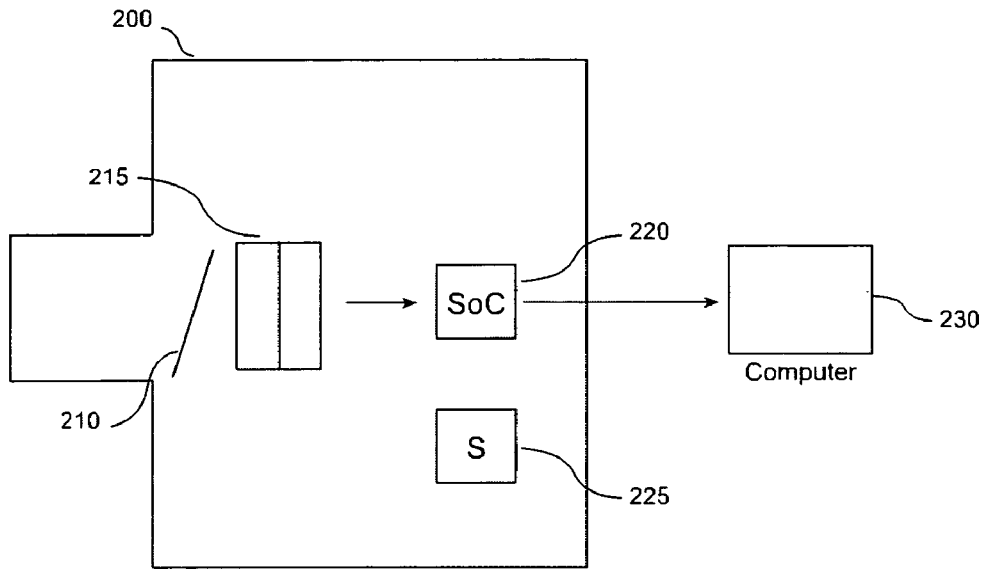
FIG. 2 is a schematic drawing of a digital camera sending an image file to an external computer.

FIG. 2 shows the process of the camera sending an image file to an external computer. The camera (200), shown with mirror (210) and sensor (215) mechanisms, sends an image file to an SoC (220), which processes the image file. The SoC sends the image file to camera storage (225) and sends the file to an external computer (230).

Figure 3:
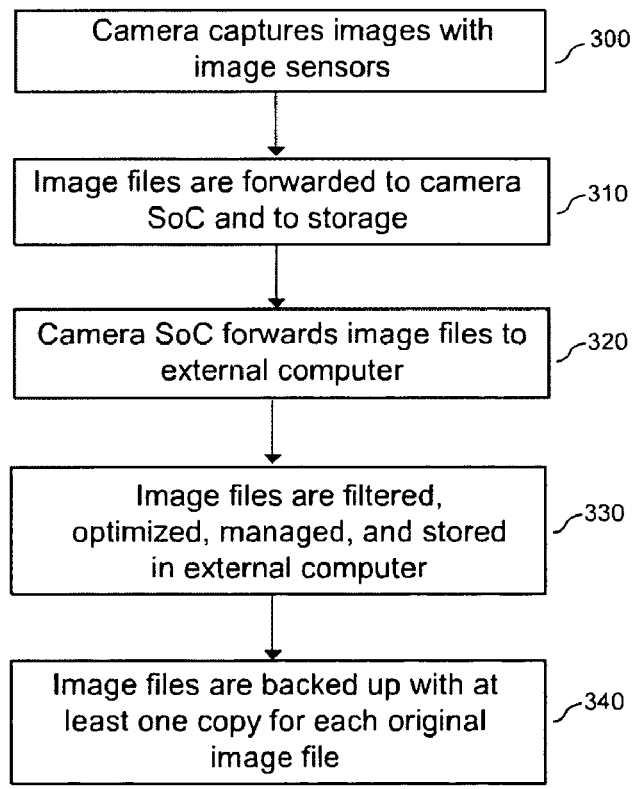
FIG. 3 is a flow chart showing the process of forwarding image files from a camera to an external computer.

FIG. 3 shows the process of forwarding image files from a camera to an external computer. After the camera captures images with an image sensor (300), the image files are forwarded to a camera SoC and to storage (310). The camera SoC forwards image files to an external computer (320) and the image files are filtered, optimized, managed and stored in the external computer (330). The image files are then backed up with at least one copy for each original image file (340).

Figure 4:
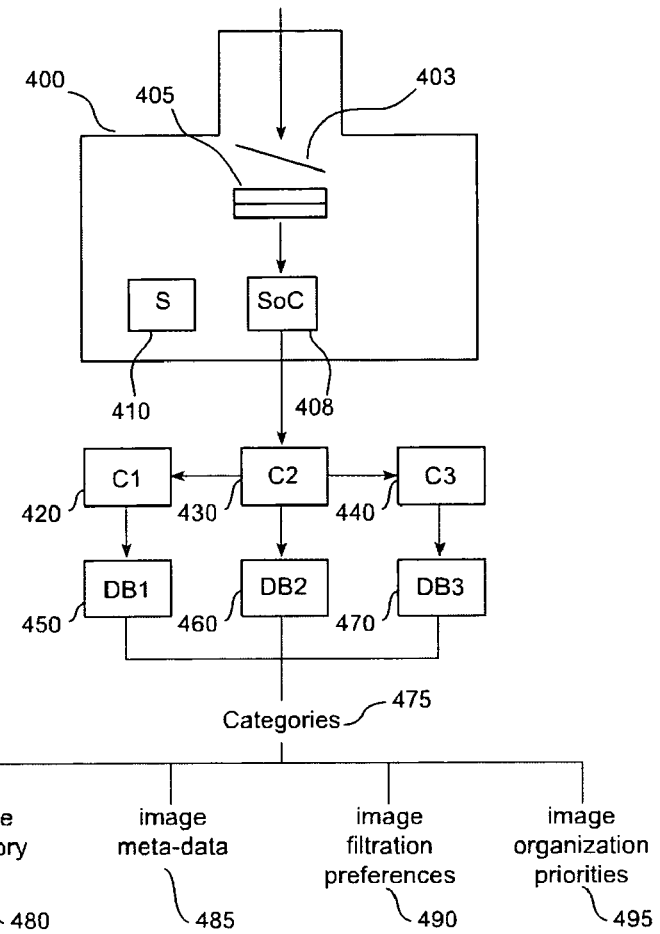
FIG. 4 is a schematic drawing of image categories in an external database to which image files from a camera are forwarded.

FIG. 4 shows the image files forwarded from a camera to an external computer database. The camera (400), shown with mirror (403) and sensor apparatuses (405), captures image files and forwards the files to an SoC (408), which forwards the files to an external computer network, consisting of three computers, C1 (420), C2 (430) and C3 (440). The computers access database 1 (450), database 2 (460) and database 3 (470). The databases use a set of categories to organize image files, including image category (480), image meta-data (485), image filtration preferences (490) and image organization priorities (495).

Figure 5:
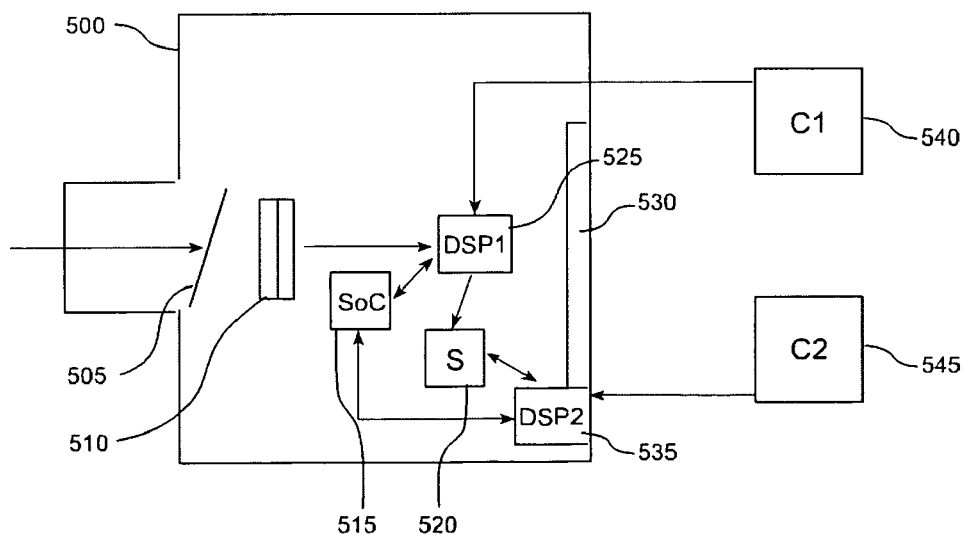
FIG. 5 is a schematic drawing showing the downloading of algorithms from two external computers to two DSPs of a camera used to filter an image in the camera.

FIG. 5 shows the process of downloading algorithms from two external computers to two DSPs of a camera used to filter an image in the camera. The camera (500), shown with mirror (505) and sensor (510) apparatuses, captures image files and sends the image files to DSP 1 (525). DSP 1 accesses the SoC (515), processes the image files and sends the image files to storage (520). The camera forwards the image files to DSP 2 (535) for processing. DSP 2 is in the display circuitry (530). External computer 1 (540) sends algorithms to DSP 1. External computer 2 (545) sends algorithms to DSP 2. These algorithms are used to process the image files.

Figure 6:
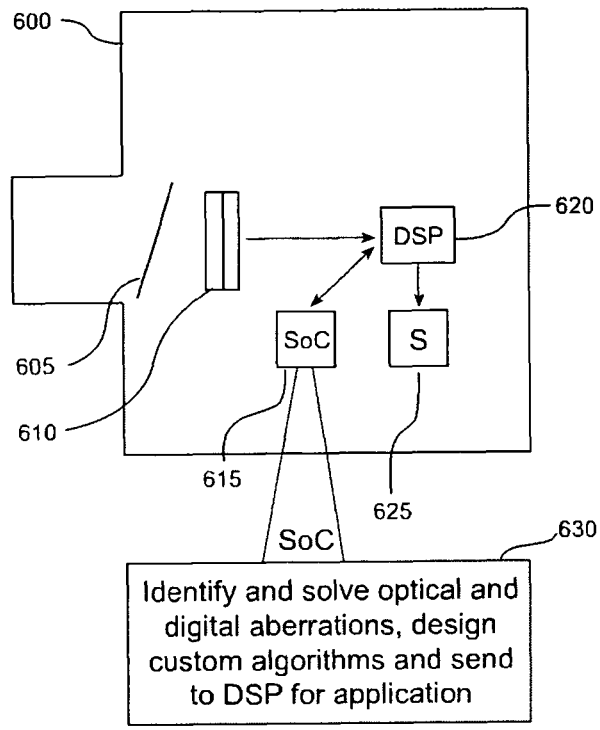
FIG. 6 is a schematic drawing showing the process of using an external computer to custom design algorithms to solve and optimize filtration of image aberrations and to download the algorithms to the camera to apply to image files.

FIG. 6 shows the process of using an external computer to custom design algorithms to solve and optimize filtration of image aberrations and to download the algorithms to the camera to apply to image files. The camera (600), shown with mirror (605) and sensor (610) apparatuses, captures the image files and sends the files to the DSP (620), which accesses the SoC (615). The SoC identifies and solves optical and digital aberrations, designs custom algorithms and sends the algorithms to the DSP for application. Once processed, the image files are sent to storage (625).

Figure 7:
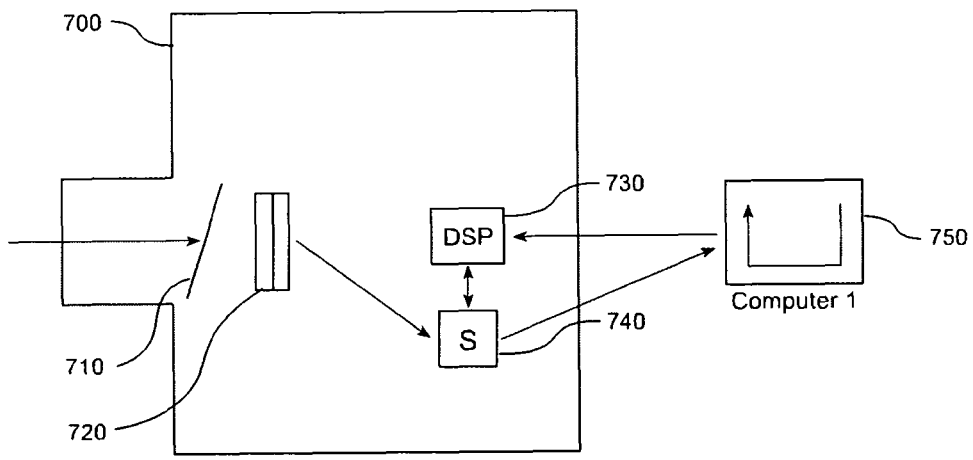
FIG. 7 is a schematic drawing showing the uploading of an image file from a camera to an external computer, the analysis of the image file and the downloading of an algorithm to the camera DSP to filter image files.

FIG. 7 shows the process of uploading an image file from a camera to an external computer, the analysis of the image file and the downloading of an algorithm to the camera DSP to filter image files. The camera (700), shown with mirror (710) and sensor (720) apparatuses, captures image files and sends the image files to storage (740). The image files are sent to the DSP (730) for filtration and then returned to storage. Image files are also sent to an external computer (750), which analyzes the files and sends algorithms to the camera DSP, which filters the image files and returns them to storage.

Figure 8:
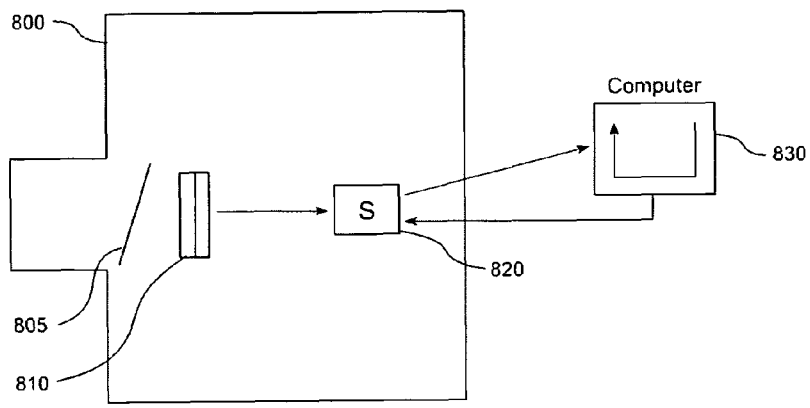
FIG. 8 is a schematic drawing showing unfiltered image files sent to an external computer for analysis, the design of a custom algorithm, the filtration of an image aberration and the return of the image file to the camera.

FIG. 8 shows the process of sending unfiltered image files to an external computer for analysis, designing a custom algorithm, filtering of an image aberration and returning the image file to the camera. The camera (800), shown with mirror (805) and sensor (810) mechanisms, captures image files and sends the files to storage (820). The image files are sent to an external computer (830), which analyzes the files, develops customized algorithms to correct aberrations and filters the image files. The filtered image files are then sent back to the camera storage.

Figure 9:
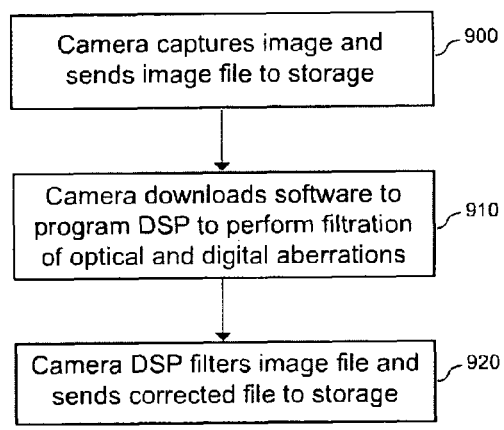
FIG. 9 is a flow chart showing the process of downloading software to a camera DSP to filter an image file.

FIG. 9 shows the process of downloading software to a camera DSP to filter an image file. After the camera captures an image and sends the image file to storage (900), the camera downloads software to program the DSP to perform filtration of optical and digital aberrations (910). The camera DSP then filters the image file and sends the corrected file to storage (920).

Figure 10:
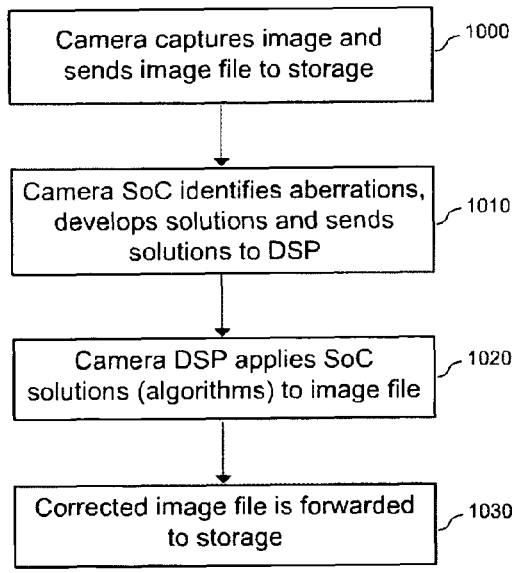
FIG. 10 is a flow chart showing the process of capturing and filtering an image file in a digital camera.

FIG. 10 shows the process of capturing and filtering an image file in a digital camera. After the camera captures an image and sends the image file to storage (1000), the camera SoC identifies aberrations, develops solutions and sends solutions to the DSP (1010). The camera DSP applies the SoC solutions (algorithms) to the image file (1020) and the correct image file is forwarded to storage (1030).

Figure 11:
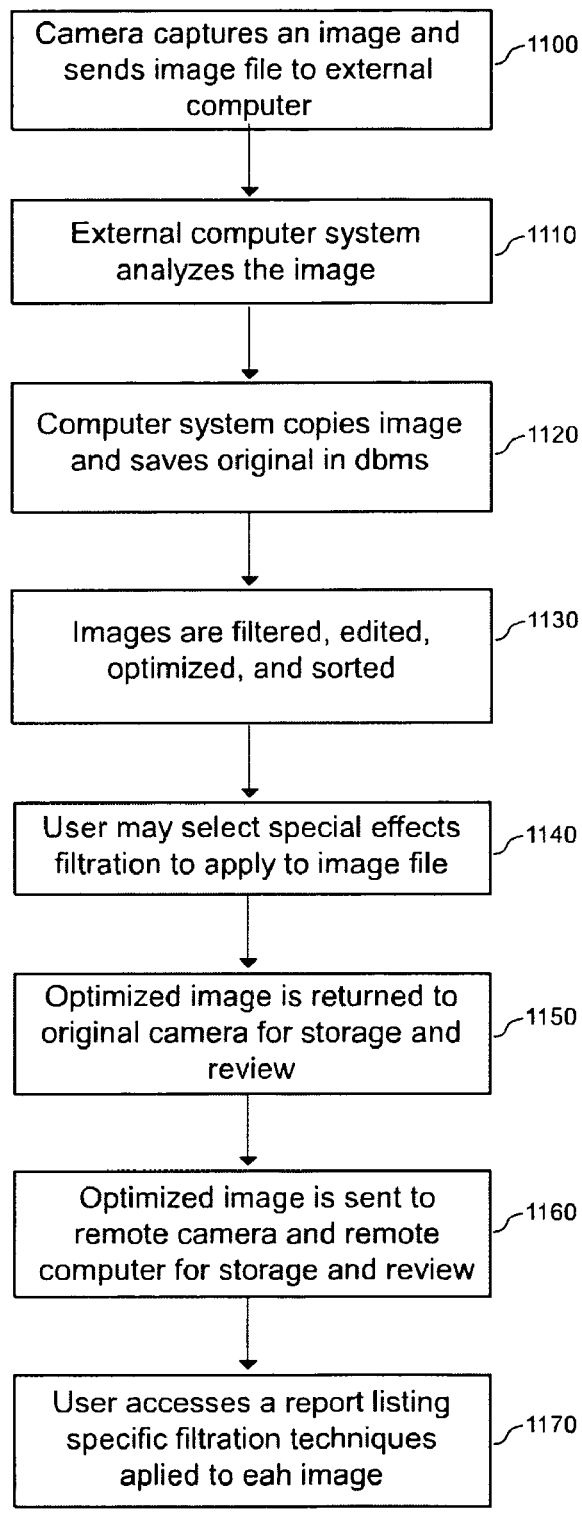
FIG. 11 is a flow chart showing the process of using an external computer to analyze and filter an image file and returning the optimized image file to the camera.

FIG. 11 shows the process of using an external computer to analyze and filter an image file and returning the optimized image file to the camera. Once the camera captures the image and sends the image file to an external computer (1100), the external computer system analyzes the image (1110) and copies the image to save the original in a database (1120). The images are filtered, edited, optimized and sorted (1130). The user may select special effects filtration to apply to the image file (1140) and the optimized image is returned to the original camera for storage and review (1150). The optimized image is sent to a remote camera and a remote computer for storage and review (1160). The user accesses a report listing specific filtration techniques applied to each image (1170).

Figure 12:
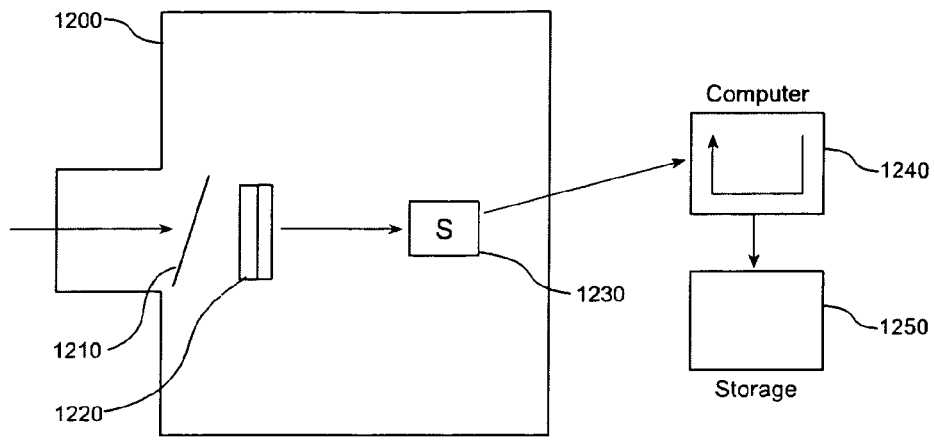
FIG. 12 is a schematic drawing showing the process of exporting image files from a camera and then optimizing and storing the files in a computer network.

FIG. 12 shows the process of exporting image files from a camera and then optimizing and storing the files in a computer network. The camera, shown with mirror (1210) and sensor (1220) mechanisms, captures an image file and sends the file to storage (1230). The file is sent to an external computer (1240), processed and stored in external storage (1250).

Figure 13:
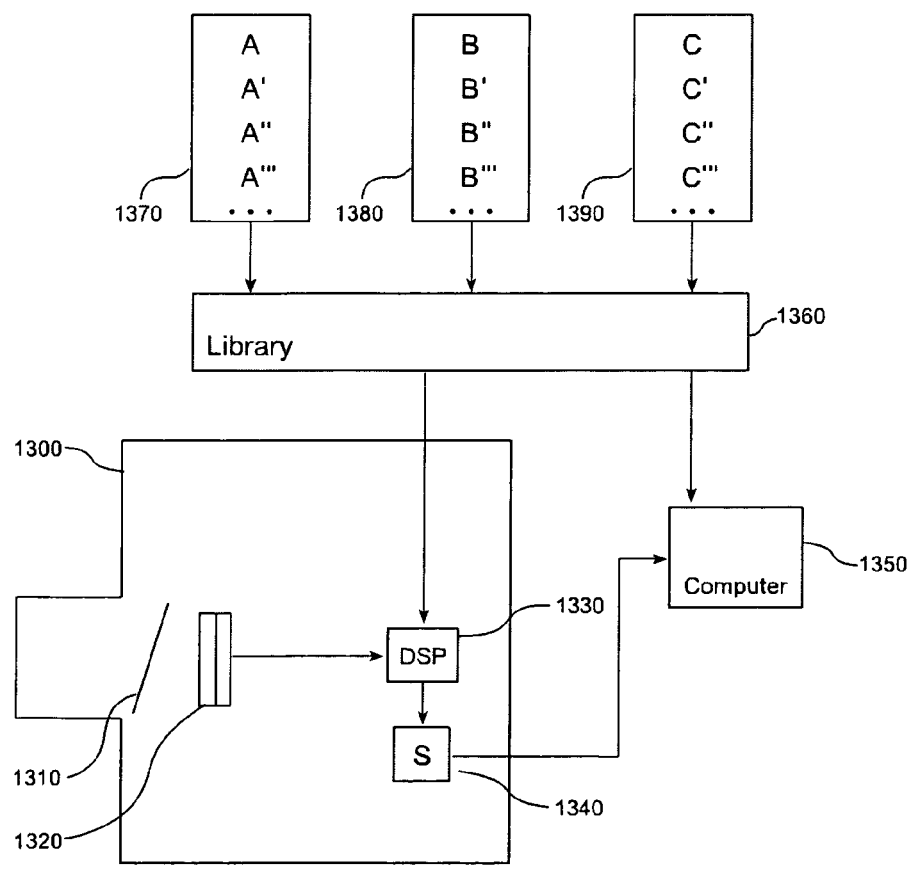
FIG. 13 is a schematic drawing showing how evolutionary software versions are downloaded to a camera DSP and computer for image filtration.

FIG. 13 shows how evolutionary software versions are downloaded to a camera DSP and computer for image filtration. Different versions of software are shown in A through A''' (1370), B through B''' (1380) and C through C''' (1390). The software are loaded into a library (1360) and distributed to the camera (1300) and to an external computer (1350) or computer network. The camera, shown with mirror (1310) and sensor (1320) mechanisms, forwards an image file to the DSP (1330). The software is downloaded to the camera and used by the DSP to process image files. Once processed, the image files are sent to storage (1340).

Figure 14:
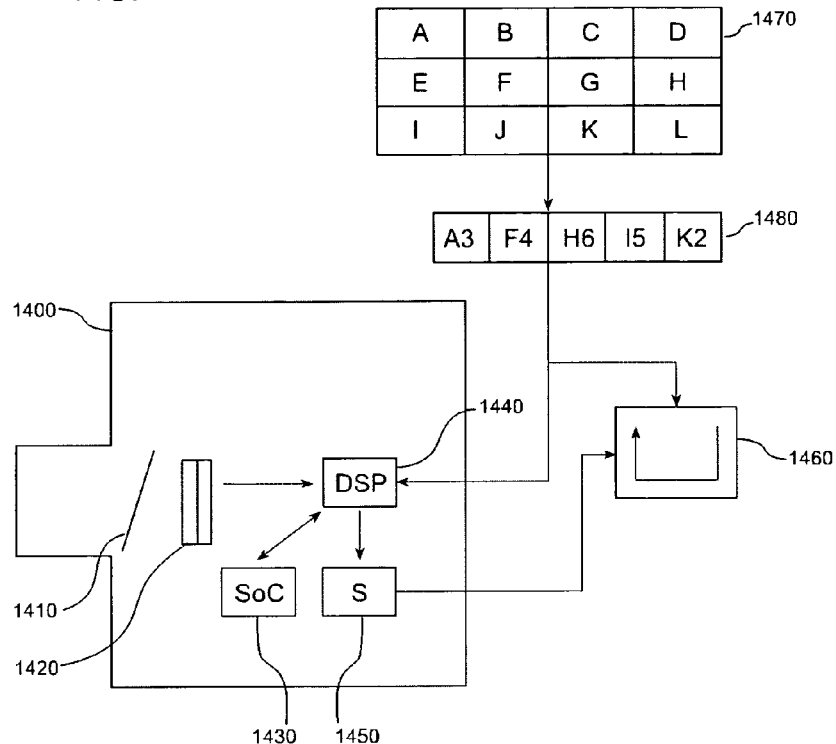
FIG. 14 is a schematic drawing showing how specific versions of algorithms are selected from a library and applied to images in a camera and/or computer.

FIG. 14 shows the process of using specific versions of algorithms that are selected from a library and applied to images in a camera and/or a computer. The algorithms (A-L) are shown in the library (1470). Specific versions of the algorithms are downloaded, specifically A3, F4, H6, I5 and K2 (1480) to the camera (1400) and the computer (1460). The camera, shown with mirror (1410) and sensor (1420), captures an image file and sends the image file to the DSP (1440). The DSP, interacts with the SoC (1430), and uses the algorithms to process the image files. Once processed, the image files are sent to storage (1450). In some cases, files are sent from camera storage to an external computer (1460) for further processing. Algorithms are downloaded directly to the computer as well.

Figure 15:
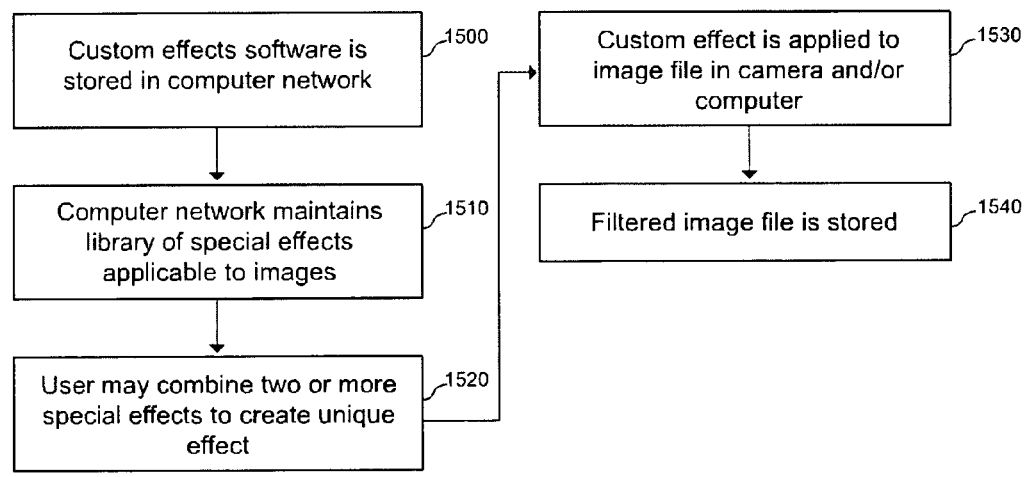
FIG. 15 is a flow chart showing the process of using two or more special effect software algorithms to filter an image file in a computer network.

FIG. 15 shows the process of using two or more special effect software algorithms to filter an image file in a computer network. After the custom effects software is stored in a computer network (1500), the computer network maintains a library of special effects applicable to images (1510). The user may combine two or more special effects to create a unique effect by combining algorithms (1520). The custom effect is then applied to the image file in the camera and/or the computer (1530) and the filtered image file is stored (1540).

Figure 16:
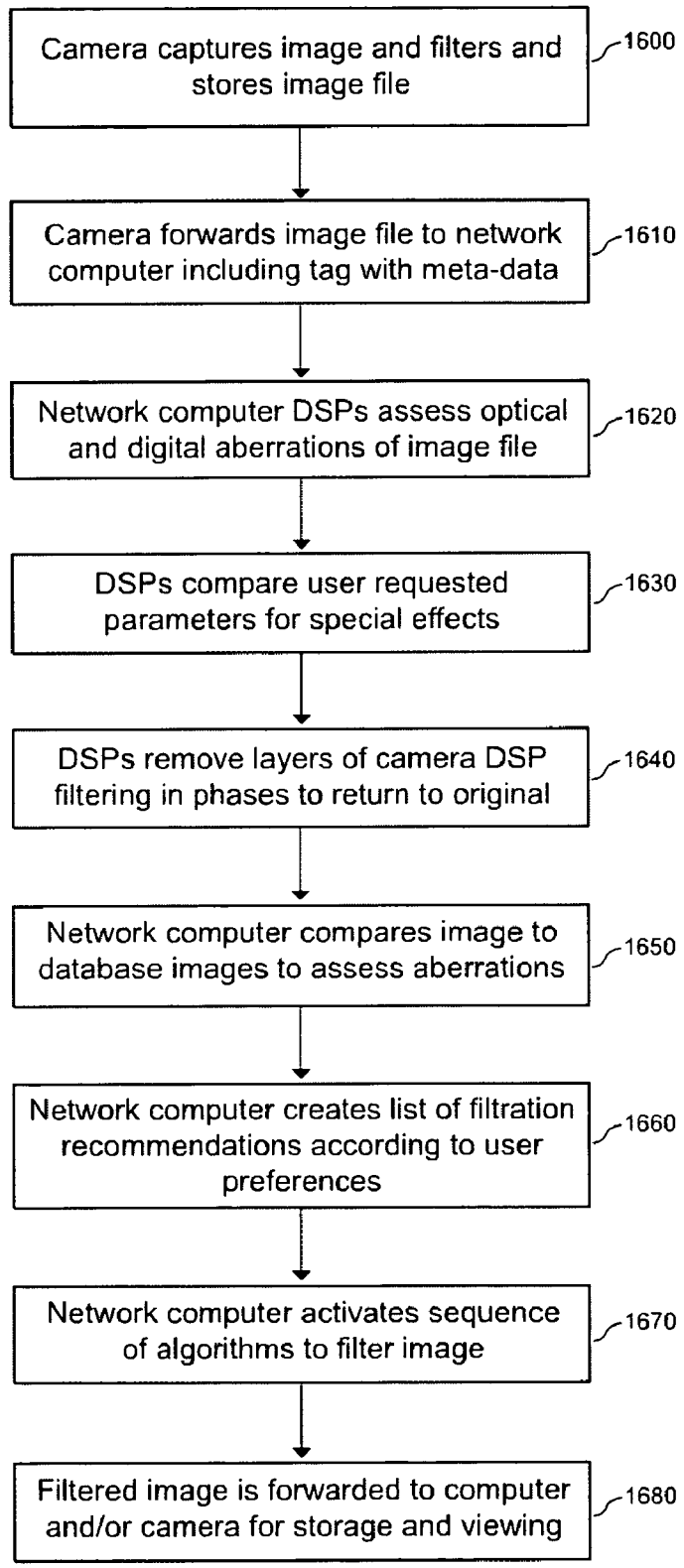
FIG. 16 is a flow chart showing the process of using a camera to capture and forward an image file to a computer network, which filters the image file and forwards the corrected image file to the camera.

FIG. 16 shows the process of using a camera to capture and forward an image file to a computer network, which filters the image file and forwards the corrected image file to the camera. After the camera captures the image and filters and stores the image file (1600), the camera forwards the image file to a network computer, including a tag with meta-data (1610). The network computer DSPs assess optical and digital aberrations of the image file (1620) and the DSPs compare the user requested parameters for special effects (1630). The DSPs remove layers of camera DSP filtering in phases to return to the original (1640) image file and the network computer compares the image to a database images in order to assess aberrations (1650). The network computer creates a list of filtration recommendations according to user preferences (1660) and activates a sequence of algorithms to filter the image (1670). The filtered image is forwarded to a computer and/or a camera for storage and viewing (1680).

Figure 17:
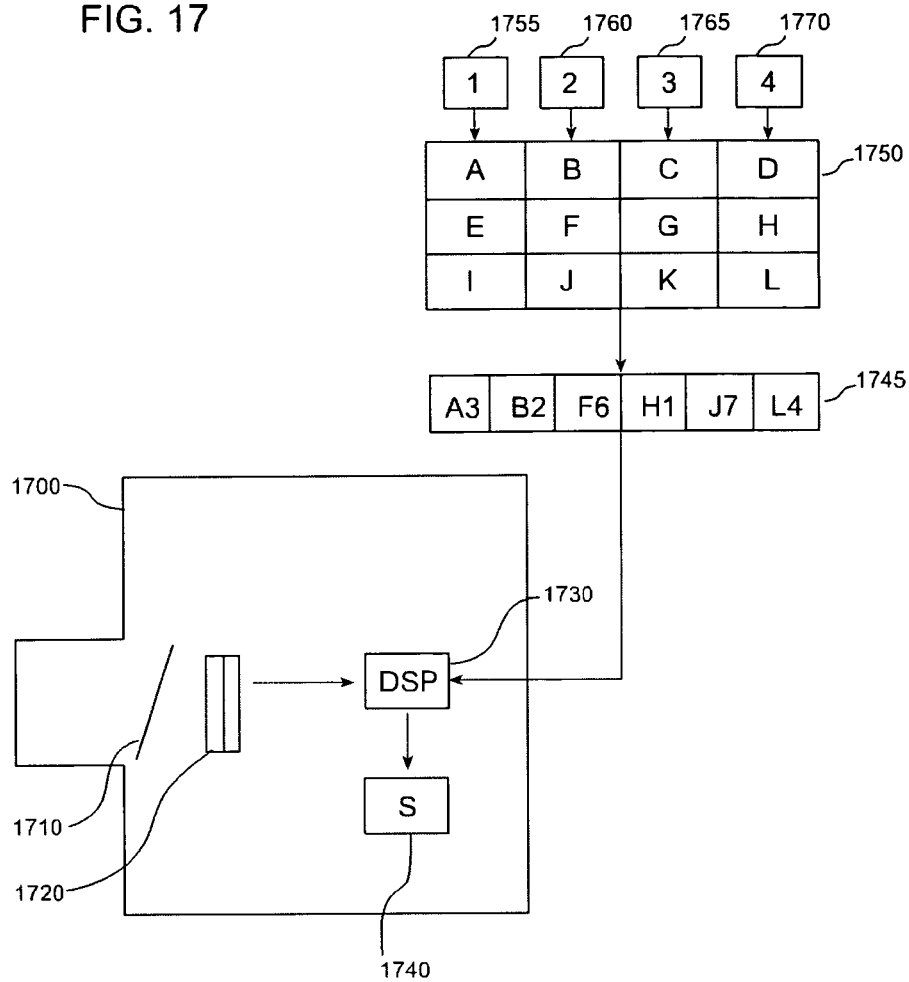
FIG. 17 is a schematic drawing showing the process of using third party vendors to update a software library and select software combinations periodically to update a camera DSP.

FIG. 17 shows the process of using third party vendors to update a software library and select software combinations periodically to update a camera DSP. The software library (1750) consists of software and algorithms A-L. Various vendors (1-4) (1755, 1760, 1765 and 1770) download software and algorithms to the library. The camera downloads a specific set of algorithms (1745), specifically, versions A3, B2, F6, H1, J7 and L4, to the camera (1700). The camera, shown with mirror (1710) and sensor (1720) mechanisms, captures an image and forwards the image file to the DSP (1730), which applies the algorithms to filter the image file, and then forwards the filtered file to storage (1740).

Figure 18:
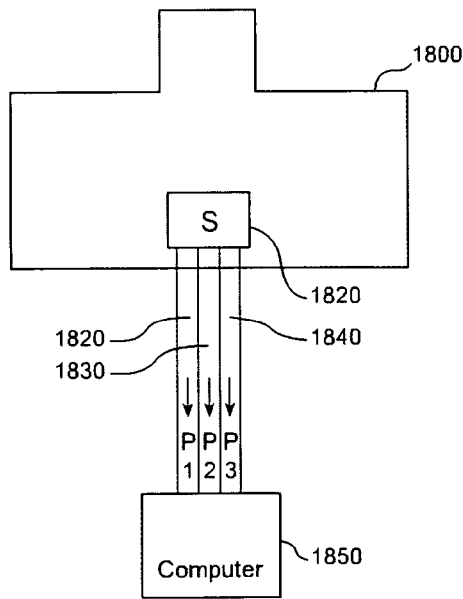
FIG. 18 is a schematic drawing showing the process of uploading image files from a camera to an external computer using a broadband communications link with three priorities.

FIG. 18 shows the process of ranking image files in high bandwidth communications to move image files from a camera to a computer. The camera (1800) downloads image files from storage (1810) in three priorities (1, 2 and 3) (1820, 1830 and 1840) to a computer (1850).

Figure 19:
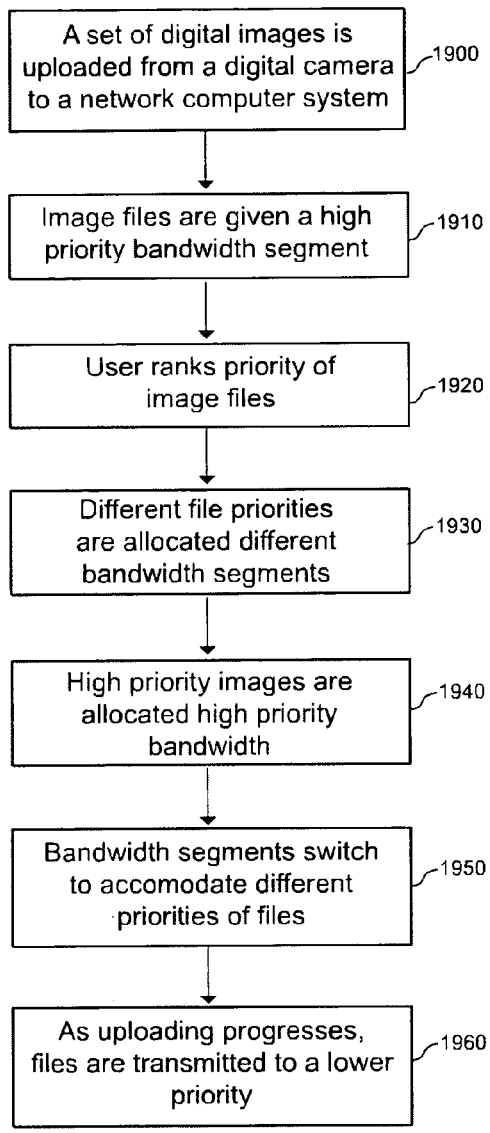
FIG. 19 is a flow chart showing the process of ranking image files in high bandwidth communications to move image files from a camera to a computer.

FIG. 19 shows the process of ranking image files in high bandwidth communications to move image files from a camera to a computer. After a set of digital images is uploaded from a digital camera to a network computer system (1900), the image files are given a high priority bandwidth segment (1910). The user ranks the priority of image files (1920) and different file priorities are allocated different bandwidth segments (1930). The high priority images are allocated high priority bandwidth (1940). The bandwidth segments switch to accommodate different priorities of files (1950). As the file uploading process progresses, files are then transmitted to a lower priority (1960).

Figure 20:
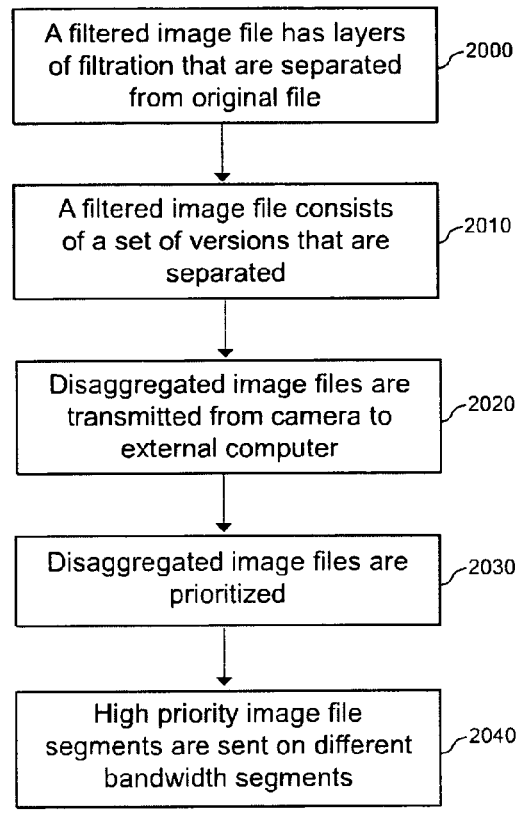
FIG. 20 is a flow chart showing the process of moving components of image files from a camera to an external computer.

FIG. 20 shows the process of moving components of image files from a camera to an external computer. Once a filtered image file has layers of filtration that are separated from the original file (2000), the file is shown to consist of a set of versions that are separated (2010). The disaggregated image files are transmitted from a camera to an external computer (2020) and the files are prioritized (2030). The high priority image file segments are sent on different bandwidth segments (2040) to correspond with their priorities.

Figure 21:
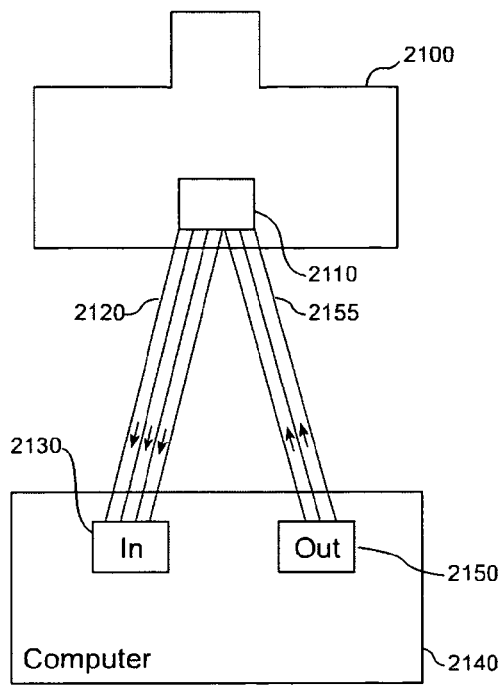
FIG. 21 is a schematic drawing showing the process of downloading software from a computer to a camera, with files uploaded from a camera to a computer with multi-segment bandwidth.

FIG. 21 shows the process of downloading software from a computer to a camera, with files uploaded from a camera to a computer with multi-segment bandwidth. The camera (2100) uploads (2120) files from storage (2110) to the input (2130) of a computer (2140). The computer processes the files and downloads the files (2155) to the camera storage.

Figure 22:
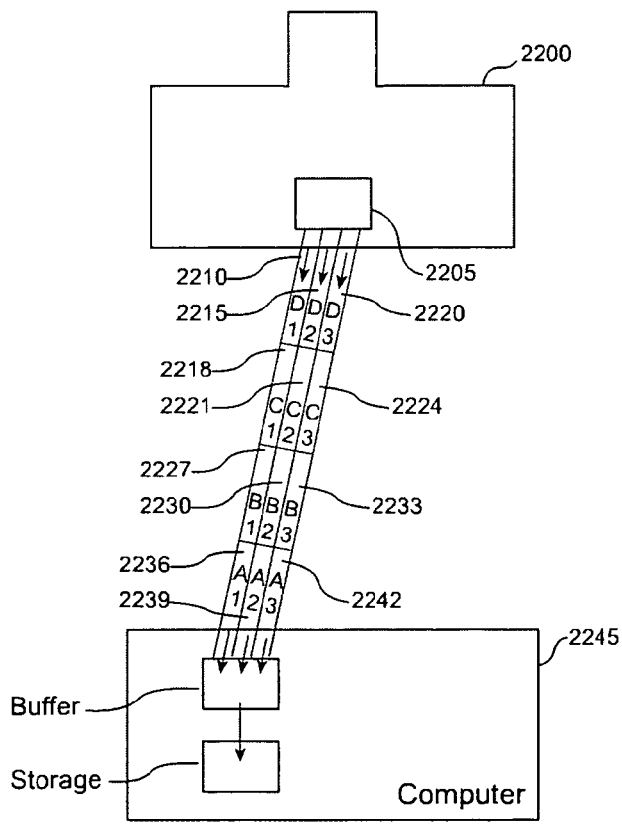
FIG. 22 is a schematic drawing showing the process of sending several video files from a camera to a computer using three segments.

FIG. 22 shows the process of sending several video files from a camera to a computer using three segments. The camera (2200) uploads video files from storage (2205) in several sets of segments. The first priority video files are sent in the sequences A1(2236), B1(2227), C1(2218) and D1(2210). The second priority video files are sent in sequences A2(2239), B2(2230), C2(2221) and D2(2215). The third priority video files are sent in sequences A3(2242), B3(2233), C3(2224) and D3(2220). The files are received by the computer (2245) buffer (2248) and then sent to storage (2250). The files may be compressed in the camera before transmission. Once received by the computer, the files may be further processed before being displayed.

Figure 23:
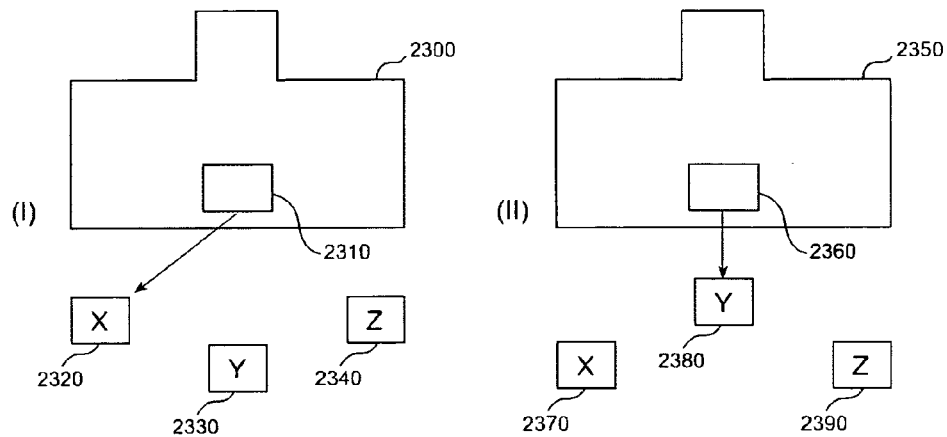
FIG. 23 is a schematic drawing showing the process of using a closest computer to a camera to upload files in a proximity priority over two phases.

FIG. 23 shows the process of using a closest computer to a camera to upload files in a proximity priority over two phases. In the first phase, the camera (2300) is shown downloading files from storage (2310) to computer X (2320), which is the closest computer in the network (including computers Y (2330) and X (2340).) In the second phase, the camera position may move and the closest computer is Y (2380). The camera downloads files from storage (2360) to Y rather than to X (2370) and Z (2390).

Figure 24:
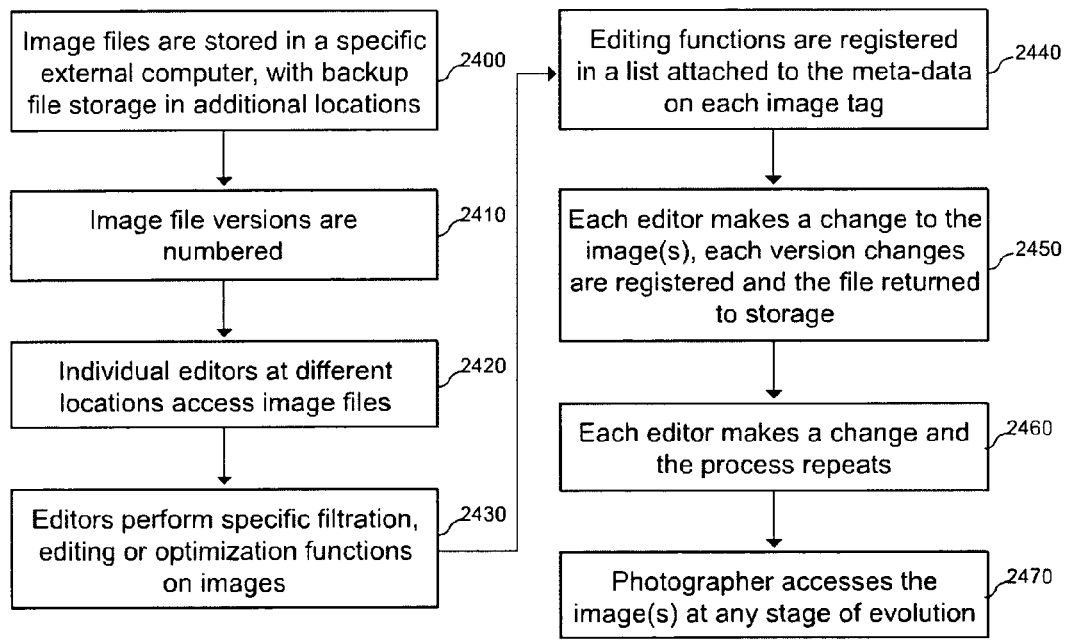
FIG. 24 is a flow chart showing the process of using individual editors at different locations to edit image files generated from a camera.

FIG. 24 shows the process of using individual editors at different locations to edit image files generated from a camera. After the image files are stored in a specific external computer, with backup file storage in additional locations (2400), the image file versions are numbered (2410). Individual editors at different locations access the image files (2420) and the editors perform specific filtration, editing or optimization functions on images (2430). The editing functions are registered in a list attached to the meta-data on each image tag (2440). Each editor then makes a change to the image(s), each version changes are registered and the file is returned to storage (2450). Each editor makes a change and the process repeats (2460). The photographer accesses the image(s) at any stage of the evolution (2470).

Figure 25:
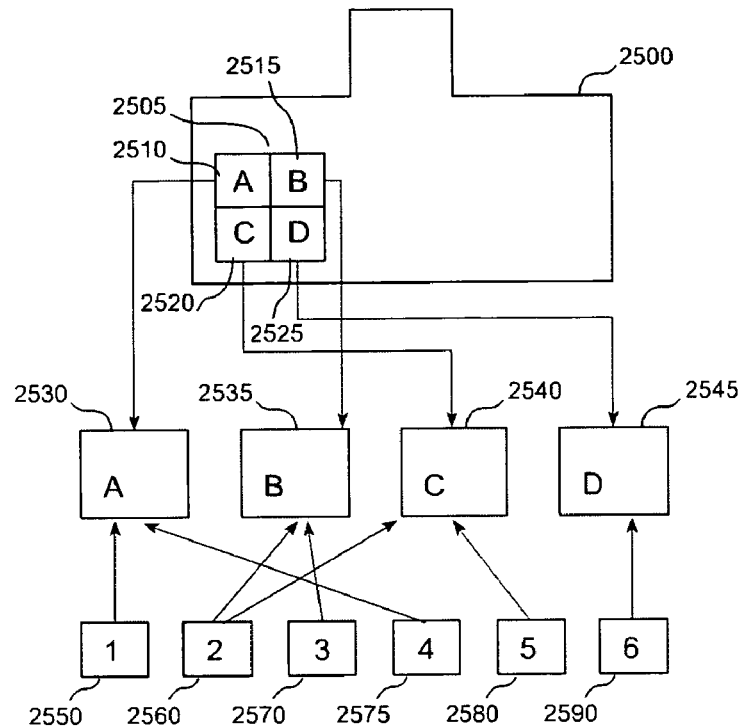
FIG. 25 is a schematic drawing showing the process of using third party vendors to update specialized computers with specialized image files.

FIG. 25 shows the process of using third party vendors to update specialized computers with specialized image files. The camera (2500) captures images and the images, A (2510), B (2515), C (2520) and D (2525), are sent from storage (2505) to external computers (2530, 2535, 2540 and 2545). Six vendors (2550, 2560, 2570, 2575, 2580 and 2590) are shown downloading software to the computers to edit the image files.

Figure 26:
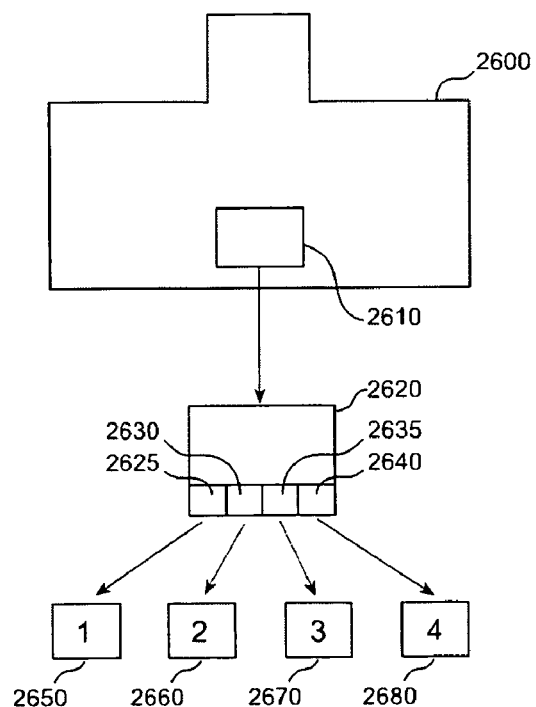
FIG. 26 is a schematic drawing showing the process of sending image files from a camera to a central computer and then rerouting the image files to specialized computers.

FIG. 26 shows the process of sending image files from a camera to a central computer and then rerouting the image files to specialized computers. The camera (2600) is shown sending files from storage (2610) to a computer 2620). The image files are then rerouted (at 2625, 2630, 2635 and 2640) to specialized computers A (2650), B (2660), C (2670) and D (2680). The specialized computers perform specific filtration or editing procedures on the image files.

Figure 27:
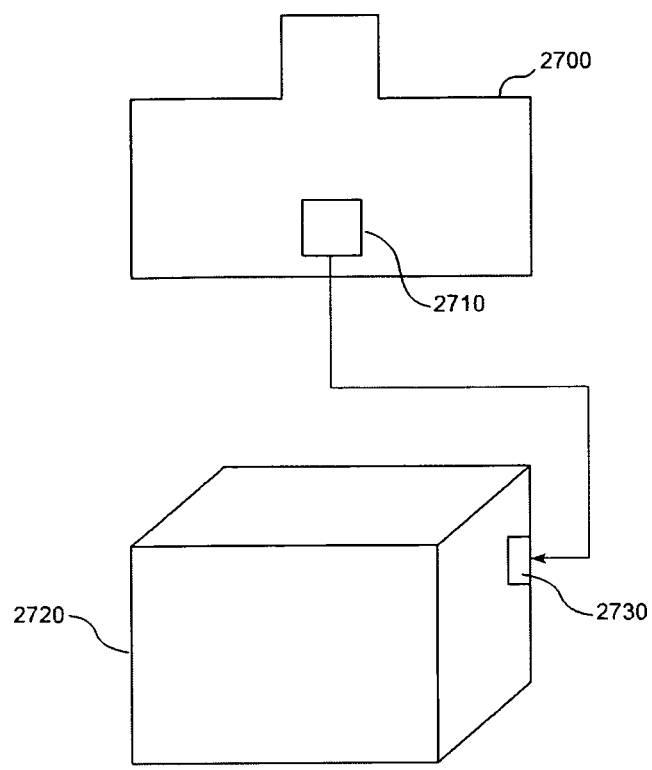
FIG. 27 is a schematic drawing showing the process of transferring image files from a camera to a printer.

FIG. 27 shows the process of transferring image files from a camera to a printer. The camera (2700) is shown downloading image files from storage (2710) to a printer (2720) storage (2730).

Figure 28:
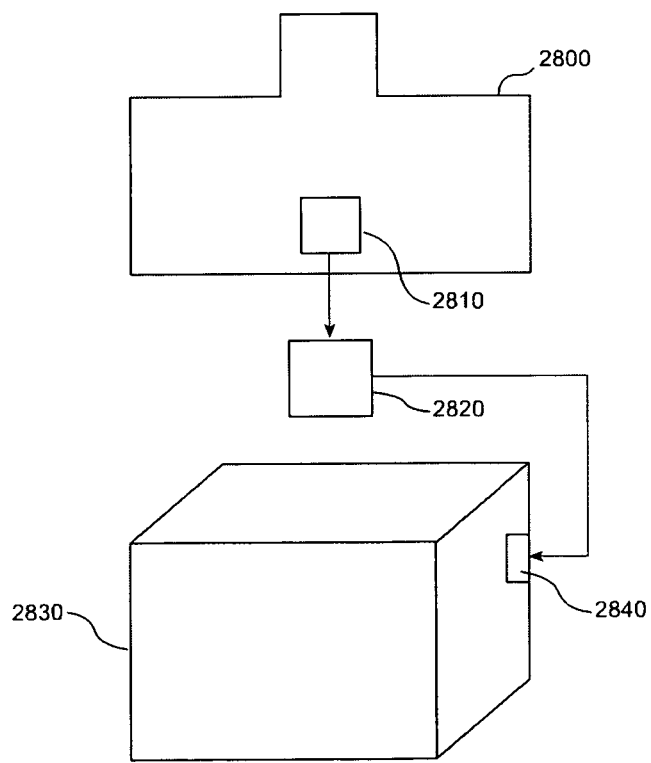
FIG. 28 is a schematic drawing showing the process of transferring image files from a camera to an external computer and then to a printer.

FIG. 28 shows the process of transferring image files from a camera to an external computer and then to a printer. The camera (2800) is shown transferring image files from storage (2810) to a computer (2820) and then to a printer (2830) storage (2840).

I claim:

1. A digital imaging system comprising:
a digital camera mechanism, an optical lens mechanism, a digital sensor, a CPU, system software and a memory storage sub-system;
a camera communications circuit configured to transmit and receive signals;
at least one external computer that includes logic circuitry, system software, at least one digital signal processor (DSP), a database management system and a storage -system;
the camera system captures an image and forwards the digital image file from the optical lens mechanism and the digital sensor to the camera storage sub-system;
the CPU sends the digital image file from the camera storage sub-system to a communications circuit;
the communications circuit sends the digital image file to the at least one external computer;
the at least one external computer in a computer network activates the logic circuits, system software, database management system and the at least one DSP to filter, edit and/or manage the digital image file;
the at least one external computer assesses specific optical and digital aberrations in the digital image file by comparing the image file to image files in the database;
the at least one external computer identifies solutions to the optical and digital aberrations in the digital image file by accessing the database;
the at least one external computer DSP applies at least one algorithm and filters the optical and digital aberrations in the digital image file; and
the modified digital image file is forwarded to the computer network memory storage.

2. The system of claim 1:
wherein the modified image file is forwarded from the external computer storage to the camera communications circuit and to the camera storage sub-system.

3. A system of claim 1:
wherein the optical image aberrations include chromatic aberrations, pin cushioning and vignetting.

4. The system of claim 1:
wherein the digital aberrations include digital aliasing, moiré, dead pixels or imprecise color rendering of the image.

5. The system of claim 1:
wherein the at least one external computer applies a user-specified special effects filtration.

6. The system of claim 1:
wherein the at least one external computer uses the database management system to organize image files according to image types and order the image files according to image category, time of origin, date of most recent access and user priority.

7. The system of claim 1:
wherein the user specifies the image filtration optimization parameters;
wherein the at least one external computer uses program code to apply specific filtration algorithms to the digital image file according to the parameters by using the at least one DSP; and
wherein the filtered digital image file is sent to storage.

8. The system of claim 1:
wherein the modified image files are organized by date, image number, image type, filtration version and user preferred rank; and
wherein the image files are stored in external computer network storage according to the user specified order.

9. The system of claim 1:
wherein the computer network maintains a library of image special effects algorithms;
wherein the user selects at least one special effects algorithm to apply to at least one image;
wherein the at least one external computer applies the at least one special effects algorithm to the at least one image; and
wherein the filtered digital image file is stored.

10. The system of claim 9:
wherein the at least one special effects algorithm is downloaded to the camera via the communications circuit;
wherein the user applies the at least one special effects algorithm to the digital image file by using at least one DSP;
and wherein the filtered digital image file is forwarded to the camera memory sub-system.

11. A digital imaging system comprising:
a digital camera mechanism, an optical lens mechanism, a digital sensor, a CPU, system software and a memory storage sub-system;
a camera communications circuit configured to transmit and receive signals;
at least one external computer that includes logic circuitry, system software, at least one digital signal processor (DSP), a database management system and a storage system;
the camera system captures an image and forwards the digital image file from the optical lens mechanism and the digital sensor to the camera storage sub-system;
wherein image filtration software is downloaded from the at least one external computer in a computer network to the camera via the communication circuit;
the camera CPU accesses the database to identify optical and digital image aberrations in the digital image file;
the camera CPU applies the filtration software to correct at least one optical or digital image aberrations in the digital image file by forwarding the file and the software to at least one camera DSP; and
the filtered image file is forwarded to camera storage.

12. The system of claim 11:
wherein the camera sends a filtered digital image file to at least one external computer by using the camera communications circuit;
wherein at least one external computer receives the digital image file;
wherein the at least one external computer logic circuits process the digital image file by using a tag with meta-data which contains information on the camera model, sensor type, lens type, aperture, shutter speed, ISO data and filtration algorithms applied in-camera;
wherein the network computer DSPs uses the database to assess the optical and digital aberrations;
wherein the at least one external computer uses at least one DSP and at least one logic circuit to process the image tag meta-data to remove layers of camera DSP filtering in a series of phases to return the image to the original image file captured by the camera image sensor;
wherein the at least one external computer uses at least one DSP and at least one logic circuit to compare the original digital image file to standardized and optimized database image files in order to assess aberrations and preferred effects;
wherein the at least one external computer uses at least one DSP and at least one logic circuit to create a list of recommended filtration techniques to apply to the digital image file by using the database comparison and user preferences;
wherein the at least one external computer uses at least one DSP and at least one logic circuit to activate a sequence of algorithms to filter the digital image file; and
wherein the filtered digital image file is forwarded to the network computer storage and/or to the user camera storage.

13. A method of image filtration which comprises
a digital camera mechanism, an optical lens mechanism, a digital sensor, a CPU, system software and a memory storage sub-system;
a camera communications circuits configured to transmit and receive signals;
at least one external computer in a computer network that includes at least one logic processing circuit, at least one digital signal processor (DSP), a database management system, system software and a storage sub-system;
wherein the image files are automatically modified, processed or filtered by logic circuits, memory circuits, DSPs and database management system in at least one external computer in a computer network, the method consisting of:
capturing a digital image by using the optical lens mechanism and the digital sensor;
processing the digital image file by using the at least one camera DSP;
using the camera CPU to send the digital image file to the camera communications circuit;
forwarding the digital image file from the camera to the at least one external computer in the computer network;
using the at least one external computer logic circuits, system software, database management system and at least one DSP to filter, edit and/or manage the digital image file according to user specified preferences;

using the at least one external computer to assess specific optical and digital aberrations in the digital image file by comparing the image file to image files in the database;

using the at least one external computer to identify solutions to the optical and digital aberrations in the digital image file by using the database;

using the at least one external computer DSPs to apply at least one algorithm to filter the optical and digital aberrations in the digital image file; and forwarding the modified digital image file to the computer network memory storage.

14. The method of claim 13:

specifying the image filtration optimization parameters according to user specified preferences; and using the at least one external computer at least one logic circuit and at least one DSP to apply specific filtration algorithms to the image file.

15. The method of claim 13:

organizing the modified image files by date, image number, image type, filtration version and user preferred rank; and storing the image files in external computer network storage according to the user specified order.

16. The method of claim 13:

downloading software from the at least one external computer to the camera by using the communication circuit;

applying the software to filter, edit or modify the digital image file by using the camera CPU and DSP; and forwarding the modified digital image file to camera storage.

17. The method of claim 13:

maintaining a library of image special effects algorithms in the computer network;

selecting at least one special effects algorithm to apply to at least one image with user specification; and applying that at least one special effects algorithm to the at least one image in the at least one external computer by using at least one DSP; and storing the filtered digital image file in network computer storage.

18. The method of claim 17:

downloading the at least one special effects algorithms to the camera via the communications circuit; and applying the at least one special effects algorithms to an image file; and forwarding the filtered digital image file to the camera storage.

19. The method of claim 13:

transmitting a digital image file from a camera to the at least one network computer DSP;

analyzing the digital image file by using a tag with metadata which contains information on the camera model, sensor type, lens type, aperture, shutter speed, ISO data and filtration algorithms applied in-camera;

using the database and the at least one DSP in the at least one external computer to assess the optical and digital aberrations;

using the image tag metadata and the at least one external computer at least one DSP to remove layers of camera DSP filtering in a series of phases to return the image to the original image file captured by the camera image sensor;

using the at least one external computer at least one logic circuit and at least one DSP to compare the original digital image file to standardized and optimized database image file in order to assess aberrations and preferred effects;

creating a list of recommended filtration techniques to apply to the digital image file by using the database comparison and user preferences in the network computer logic circuits and at least one DSP;

activating a sequence of algorithms to filter the digital image file by using the network computer at least one DSP; and forwarding the filtered digital image file to the network computer storage or to the user camera storage.

* * * * *